United States Patent [19]

Horner, Jr.

[11] 4,295,880

[45] Oct. 20, 1981

[54] APPARATUS AND METHOD FOR RECOVERING ORGANIC AND NON-FERROUS METAL PRODUCTS FROM SHALE AND ORE BEARING ROCK

[76] Inventor: John W. Horner, Jr., 150 Martin St., Longmont, Colo. 80501

[21] Appl. No.: 144,831

[22] Filed: Apr. 29, 1980

[51] Int. Cl.³ .............................................. C22B 4/00
[52] U.S. Cl. ...................................... 75/10 R; 75/63
[58] Field of Search ..................................... 75/10–12, 75/68 R, 63, 65 R

[56] References Cited

U.S. PATENT DOCUMENTS

| | | | |
|---|---|---|---|
| 2,039,165 | 4/1936 | Hayakowa | 75/68 R |
| 2,810,637 | 10/1957 | Spendlove | 75/68 R |
| 3,234,010 | 2/1966 | Mahony | 75/65 R |
| 3,443,806 | 5/1969 | Galey | 75/10 R |
| 3,951,651 | 4/1976 | Mehrabian | 75/10 R |
| 4,131,453 | 12/1978 | Kim | 75/10 R |

*Primary Examiner*—P. D. Rosenberg

*Attorney, Agent, or Firm*—Kyle W. Rost

[57] ABSTRACT

Crushed shale and metal ores are fed via an oxygen purging duct in batches to a closed extraction chamber having a coreless high frequency electric induction furnace, where the raw materials are deposited on the surface of a molten non-ferrous metal charge in the crucible of the furnace. Natural induction stirring in the molten metal charge thoroughly contacts all grains of the raw material with the molten surface of the metal charge, thereby extracting non-ferrous metals from the raw material into the metal charge and vaporizing organic components such as petroleum into the non-oxidizing atmosphere in the extraction chamber. The residue of raw material is then skimmed from the furnace and discharged from the chamber by way of a chute having an air lock for preventing return of oxygen to the chamber. Organic components from the chamber are carried by a conduit to an associated fractionating tower for immediate refining at least partially by the heat from the furnace.

16 Claims, 1 Drawing Figure

APPARATUS AND METHOD FOR RECOVERING ORGANIC AND NON-FERROUS METAL PRODUCTS FROM SHALE AND ORE BEARING ROCK

BACKGROUND OF THE INVENTION

1. Field of the Invention

The invention relates to distillation processes and apparatus and also to mineral oils, preparation, recovery or extraction from solid natural sources, and specifically to recovery from shale or bituminous sand. An aspect of the invention also relates to metallurgical apparatus, including means for treating ores or for extracting metals.

2. Description of the Prior Art

Petroleum products are recovered from shale or bituminous sands by retorting at approximately 900° F. It is known to use closed retorts wherein a suitable source of heat vaporizes the carbonacous material known as Kerogen into gas and oil vapors, after which the vapors are condensed in a fractionating device. In order to control the heat supplied to the retort and prevent oxidation of the petroleum, a liquified metal may be interposed between the source of combustion and the shale. For this purpose lead has been used.

Further shale processing techniques include direct contact and immersion in molten baths of metal or salts. It has been proposed, for example, to introduce crushed shale into a molten bath of lead or lead-zinc from an inlet near the bottom of the bath, and then permit the shale to rise through the molten metal. Petroleum products are recovered as a vapor at the top of the bath and subsequently condensed, and the spent shale is discharged at the top of the bath as a waste product. Zinc has been used in combination with the lead in such a bath on the theory that gold, silver, and other precious metals from the shale can be recovered in dissolved form from the zinc. Other direct contact techniques simply place the shale on the top of a molten metal bath via a continuously operating conveyor belt that also continuously skins spent shale from the bath.

Lead and lead compounds or mixtures have been preferred because this metal has a liquid state between suitable temperatures, 800° F. to 1000° F., for petroleum recovery, and in addition, lead has a specific gravity sufficiently high that the spent shale is easily recovered from the upper surface of the bath. The possibility of employing lighter metals such as aluminum, lithium and sodium has been examined, but the difficulty of recovering the spent shale from the bottom of the metal bath presents a problem. A drawback to using a metal imersion bath is that coke-like products produced during the petroleum recovery process tend to be sticky and to adhere to the surface of the reaction vessel. It has been proposed to introduce an artificial swirling motion in a metal bath by pumping molten metal continuously into the bath and thereby discourage coke build-up on the vessel walls.

SUMMARY OF THE INVENTION

Minerals such as oil and gas as well as non-ferrous metals are recovered from suitable rock or ores, including oil shale, by mining the raw mineral material; crushing it for ease of handling and more efficiency of mineral extraction; and removing the recoverable organic and non-ferrous metal components by heating the raw material and contacting it with the surface of molten non-ferrous metal through the natural stirring action of an electric induction furnace having a non-oxidizing atmosphere in the recovery area. The raw material may be received in a hopper and fed through a duct leading into an extraction chamber covering the top of the furnace, and the duct may be equipped with a suitable means for preventing oxygen from entering the chamber as well as means for metering the desired quantity of raw material for batch treatment. One suitable duct structure includes a two gate system having intergate volume sized to receive a single batch, and oxygen purge may take place as the batch is stored in the intergate volume, such as by venting a non-oxygen gas through the intergate area. When a suitable atmosphere is established in the intergate area, the batch is released into the extraction chamber, where it falls into the crucible of the induction furnace and is subjected to constant stirring by the natural movement of the molten metal charge. Non-ferrous metals are absorbed into the molten metal charge even when the charge is below the normal melting temperature of the extracted metal. Petroleum products are vaporized into the extraction chamber and routed to a fractionating tower for refinement without intermediate storage. The heat of the induction furnace, which may be maintained at accurately determined temperatures in the range from 300° F. to 2000° F., is used for the refining process. The spent raw material from the furnace is removed by a skimmer and discharged through an outlet chute, which may have a two gate system and oxygen purge apparatus similar to that of the inlet duct for maintaining the quality of the atmosphere within the reaction chamber.

The main object of the invention is to recover valuable mineral products such as oil, gas, and non-ferrous metals in an efficient method wherein the natural stirring action found in electric induction furnaces is used to contact the raw material with the molten metal of the furnace charge.

A further object is to create apparatus and method for both recovering shale oils and, at the same time and without the expenditure of substantial additional energy, recovering valuable non-ferrous metals that may be found in the same or different rock. Non-ferrous metals may be extracted from waste products, ores, electroplated surfaces, or ferrous metals by dissolving them in aluminum or aluminum alloys. The non-ferrous products may subsequently be recovered by dissociation to extract the individual non-ferrous metals for commercial use.

Still another object is to create a mineral recovery apparatus that eliminates the need to store shale oil prior to refining. The heats attainable by an electric induction furnace are sufficiently high that vaporized crude shale oil can be processed immediately in a fractionating tower, part of the product being useable to power on on-site electrical generator for running the induction furnace.

An important object is to create method and apparatus for recovering valuable products that occur either in the same or different mineral raw materials. Non-ferrous metals and shale oils may exist in the same or different rock strata. By a suitable mixture of raw materials containing these two recoverable products, the process can be conducted for simultaneous production of both.

DESCRIPTION OF THE PREFERRED EMBODIMENT

Figure 1:
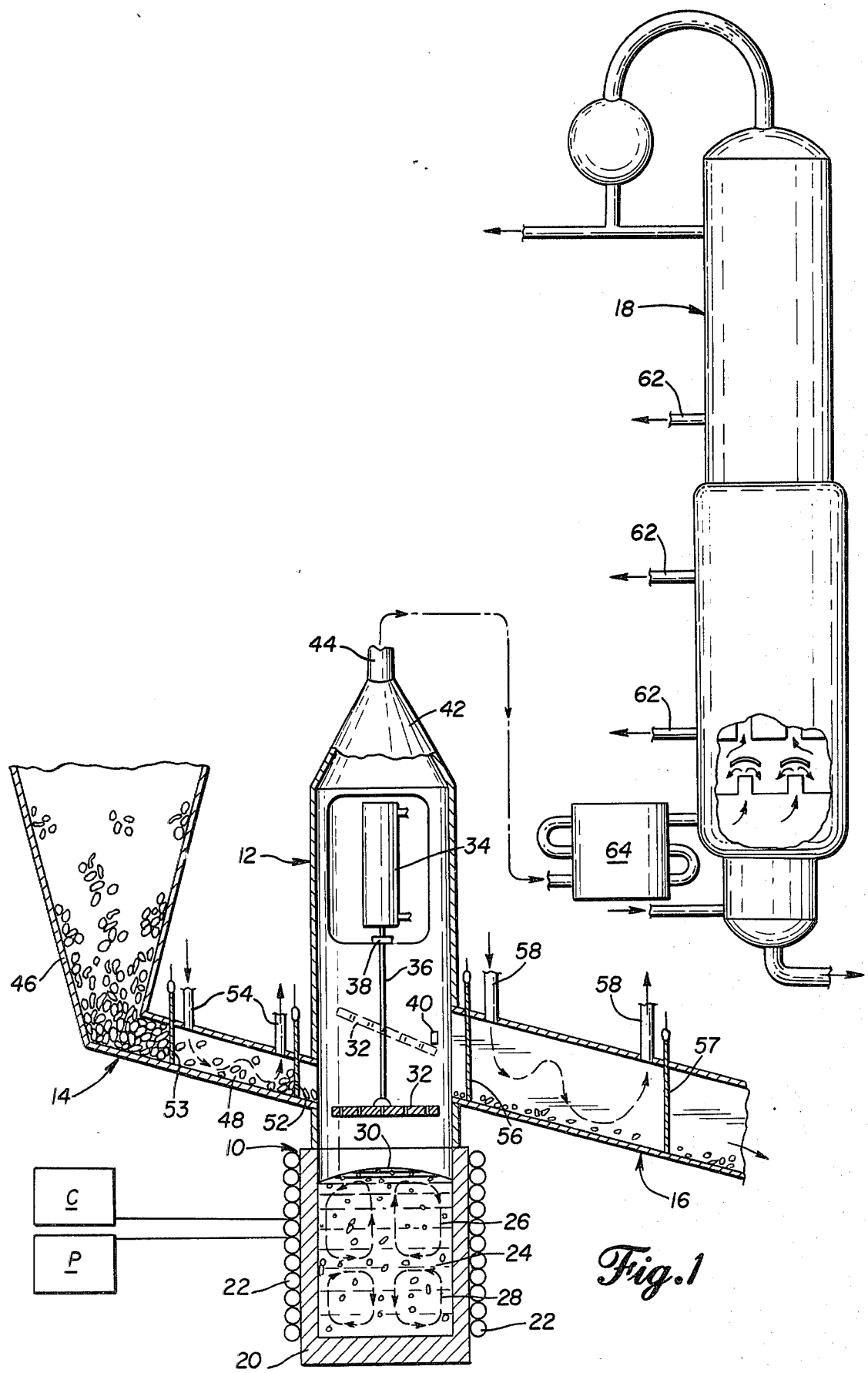
FIG. 1 is a diagrammatic view of the apparatus for carrying out recovery of both shale oils and non-ferrous metals.

The apparatus shown in FIG. 1 employs a coreless electric induction furnace 10 having an extraction chamber 12 associated closely with the furnace for containing a suitable reducing atmosphere that permits removal and recovery of petroleum products from the shale, tar sands, and the like. For convenience all such products will be referred to as oil shale. Suitable infeed and outfeed apparatus is associated with the furnace and extraction chamber for processing batches of oil shale. The infeed apparatus 14 delivers a batch of suitable size to the induction furnace after the immediately preceeding batch has been removed into the outfeed apparatus 16 for disposal. A petroleum fractionating tower 18 may optionally be connected to the extraction chamber to receive the vaporized petroleum products and separate the products in the known manner.

The electric induction furnace is constructed according to known practice and includes a crucible 20 of refractory material, which may include graphite, clay-graphite, or silicon carbon, although the latter material is unsuited for use in high frequency furnaces because of its nature as a susceptor in a magnetic field. The crucible is laterally surrounded by an induction coil 22, which is wound with the crucible as its core so that the magnetic field produced by the coil will induce a secondary voltage in the metal charge 24 contained inside the crucible. A power source P supplies AC current of predetermined frequency to the coil, which then creates a magnetic field that is the energy carrier. The field passes through the metal charge 24 and induces an electric current therein, in turn producing a secondary magnetic field in the charge in the opposite direction to the field of the induction coil. The opposed magnetic fields create a mechanical force that causes movement in the molten metal when the charge has liquified.

The movement of the molten metal assumes a predictable stirring pattern indicated by dashed arrows 26 and 28 showing counter currents in the upper and lower portions of the crucible. This stirring pattern has been explained to result from the interaction of the primary and secondary magnetic fields, with the stirring increasing with increasing power input to the coil and with decreasing frequency. The mechanical forces created between the primary field and the secondary field are perpendicular to the magnetic lines, as is the case with any magnetically created mechanical force. The magnetic lines are parallel through the center of the crucible, applying the greatest mechanical force toward the center of the crucible in the middle of the induction coil's height, thereby accounting for the radially inward movement of the molten charge at this point. Where the mechanical force is weaker, such as near the top and bottom of the coil, the molten charge flows outwardly against the force. The charge characteristically has a raised center or miniscus 30 resulting from the interaction of mechanical forces. A known formula permits calculation of the miniscus height in percent of coil length as a function of induced power and frequency. The miniscus height in percent of coil height is a direct indication of the degree of stirring action velocity.

Current density in the coil and heat loss through the crucible wall require that a cooling system C be employed. Water cooling systems using either a water-to-water or an evaporative heat exchanger are employed. The cooling system will generally include a cooling tower and will require a source of make-up water.

Extraction chamber 12 is a hood that fits closely to the top of the crucible 20 so that the atmosphere inside the hood can be controlled in composition. Organic products are susceptible to combustion at the operating temperatures of the coreless induction furnace, which can be accurately controlled from 300° F. to 2000° F. A non-oxygen atmosphere such nitrogen is therefore maintained in chamber 12. A skimming screen 32 is contained within chamber 12 and is carried for motion between raised and lowered positions permitting the screen to remove spent shale or other nonmetal waste product from the crucible charge. For this purpose the screen has the dual functions of both a skimmer and a strainer. A suitable means is provided to selectively raise and lower the screen. One such means may be cylinder 34 powered pneumatically or hydraulically. Because the chamber 12 retains heat from the crucible, the cylinder 34 is located outside the chamber, such as in a recess on the outer chamber wall; and the piston rod or connecting linkage 36 to the strainer operates within the chamber 12 through a suitably close fitting or sealed opening 38 in the chamber wall. A means for tilting the skimming screen is provided to encourage residues to fall into outlet chute 16. Such tilting means may include a retainer block 40 on the inside wall of chamber 12, positioned to strike the screen when it assumes the raised position shown in phantom, thereby causing the screen to tilt toward the outlet chute. The top of chamber 12 contains a connection 42 to conduit 44 leading to further processing apparatus. Petroleum vapors are directed through connection 42 by the heat of the induction furnace.

Intake chute 14 includes a hopper 46 that receives crushed oil shale or other raw material. The shale is preferred to be uniformly crushed to a fine state so that the shale has maximum surface area contact with the crucible charge. Hopper 46 is connected to an inclined duct 48 that transmits raw material to the inlet opening 50 of the extraction chamber. In order to control the flow of raw material, two metering gates 52, 53 are located at spaced intervals in the duct. The gate 52 closer to chamber 12 is raised to release a waiting batch of raw material from between the gates to fall into the chamber, while the gate 53 further from the chamber is raised to replenish the intergate volume with raw material from the hopper. Gas purge lines 54 communicate with the intergate volume to flush oxygen from the air introduced by the opening of gate 53. The purge lines circulate a non-oxygen gas through the waiting batch to displace oxygen.

Outlet chute 16 also is connected to the chamber 12 and includes a pair of spaced apart gates 56,57 creating an air lock that both prevents oxygen from entering the chamber and prevents free loss of furnace heat. Gate 56 closest to the chamber is closed whenever the collected residues in the outlet chute are to be discharged from the chute, and gate 57 further from the chamber is opened subsequently to permit the actual discharge. A pair of purge lines 58 communicate with the intergate volume for removing oxygen after gate 57 has been closed and before gage 56 is reopened. Both inlet chute and outlet chute may operate by gravity, or a moving means such as an auger may assist in moving the raw material and the spent residue.

Petroleum vapors produced in the extraction chamber may be routed through conduit 44 directly to a fractionating tower 18, where the vapors are immediately separated into fractions drawn off at various levels 62 of the tower. A reheating means such as burner 64 may preceed the fractionating tower if necessary. Shale oil tends to be quite viscous and will deteriorate if stored for lengthy periods. Refining in a common process with recovery is therefore desirable, with or without supplemental heat from burner 64.

In operation, the induction furnace 10 is first filled with a charge of aluminum or other suitable non-ferrous metal or alloy that can be readily melted in a crucible of graphite or other refractory. The charge is melted by the normal operation of the electric induction furnace and the previously described stirring action and miniscus are established. The temperature of the charge is controlled accurately from 300° to 2000° F. by monitoring current. Because of the natural stirring, fresh metal is continuously moved to the top of the crucible. A non-oxidizing atmosphere is established in the extraction chamber by gas purge or other means. Gas purge may be accomplished by opening gates 52 and 56, and then operating purge lines 54 and 58 to transmit non-oxygen gas between the two chutes.

When induction furnace and extraction chamber are thus prepared, gate 52 is closed, gate 53 is opened to admit raw material into the intergate volume, and gate 53 is then closed to permit gas purge in the intergate volume. Oil recovery is initiated when gate 52 opens to admit the waiting batch of crushed raw material into the extraction chamber, where the material falls into the molten metal of the crucible. Gate 52 is then closed, and the process of filling the intergate volume and purging of oxygen is repeated.

The surface of the molten metal serves as the stove to heat and vaporize any organic material upon contact. Because there is no reaction between the metal and organic or carbon materials, the organic products are vaporized and rise through the extraction chamber for eventual processing in the fractionating tower. Known processes such as upgrading, cracking, polymerization, alkylation, hydrogenation, and reforming may be practiced to produce a range of petroleum products from the shale oil. The stirring action of the induction heated metal continuously exposes the surfaces of the carbon containing raw material to the molten metal stove and separates them by gravity as the vapors rise. The intense heat produced and accurately controlled by the induction furnace and induction current control may operate the complete extraction plant as well as the refining apparatus.

After a batch of raw material has been thoroughly heated to vaporize the recoverable materials, the skimmer 32 is lowered into the metal and raised with the spent residue captured on its surface. Molten metal may drain from the skimmer, after which gate 56 is opened and the skimmer is further raised until it encounters the retainer block 40, which tips the skimmer and causes the spent residue to fall into the outlet chute, partially or entirely filling the intergate area. Gate 56 may thereafter be closed and gate 57 opened to dispose of the residue. After gate 57 is again closed, the intergate area is purged of oxygen.

The products of the described process include vaporizable organic materials, spent non-organic residue, heat, water, and non-ferrous metals. The organic materials, primarily in the form of shale oil and gas, are a primary product. The spent residue contains alumina, silica, and certain types of clay that may be employed in the known catalytic cracking process for recovery of petroleum products from the shale oil. Heat recovered from the furnace, fractionating tower, or cooling towers may be recovered and used to dry the incoming raw material, as by circulating warmed purge gases via lines 54 through the waiting batch of raw material. Water recovered from the raw material in any stage of processing may be used in the cooling towers of the furnace and refining tower. Organic gases recovered from the process may be immediately recycled for use in a generating plant to supply electricity to the induction furnace.

Non-ferrous metals may be recovered in the furnace charge by absorption. It has been found that molten aluminum or aluminum alloy will dissolve other non-ferrous metals from ores even if the aluminum is not at the recognized melting point of such other non-ferrous metals. The recovery of such metals is enhanced by the reducing atmosphere created by the heated carbon from the processing of shale, coal, or carbon wastes in the induction furnace. Although the percentages of non-ferrous metals in oil shales may be quite small, recovering these metals helps to maintain the level of the crucible charge against loss in the removed spent shale, and the continued processing of shales can result in the recovery of substantial quantities of such other non-ferrous metals.

In an experiment to determine what quantities of non-ferrous metals might be recovered, a coreless induction furnace was charged with 85 pounds of aluminum alloy known to contain copper, zinc, and silicon. Laboratory analysis showed the following percentages of copper and zinc:

| | |
|---|---|
| copper | 4.67% |
| zinc | 1.91%. |

After the charge had become liquified, ten pounds of dried ore plus combonaceous graphite and charcoal of unmeasured quantity were added to the crucible and stirred by the described induction stirring. Thereafter, the residue was skimmed off and the metal poured into ingot molds. A sample of an ingot was then laboratory analyzed for a variety of non-ferrous metals, with the following results:

| | |
|---|---|
| Copper | 5.29% |
| Silver | .003 |
| Gold | none |
| Mercury | none |
| Zinc | 2.28 |
| Cadmium | .001. |

Comparison of the amounts recovered with the composition of the starting alloy yields the possibility of the following recovery in the routine processing of such raw materials:

| | |
|---|---|
| Silver | .51 lb. per ton ore |
| Copper | 102 lb. per ton ore |
| Zinc | 66.3 lb. per ton ore |

| | |
|---|---|
| Cadmium | .17 lb. per ton ore. |

The percentages of non-ferrous metal recovered are increased with increasing exposure of the ore to the molten aluminum alloy. Exposure is maximized by increasing the fineness of the ore and increasing the contact time in the crucible. Thus, the ore may be processed specially for maximum metal recovery by first mining and crushing the raw material; then pulverizing in a ball mill; and concentrating the ore by means of a gravity system to separate the heavy metal-bearing ore from lighter materials such as silica, mica, and alumina. Thereafter, the heavy ore may be treated in a high frequency induction furnace to remove the non-ferrous metals. Precious metals are recovered from the crucible charge by electrolytic or pyrometic smelting. The concentrated ore may be processed at the same time and with the same system as for the extraction of oil, gas, and carbon products from shale, coal, or organic materials to increase the economy of both processes.

The aluminum alloy in the starting charge for recovery of non-ferrous metals or organic products may be substantially any raw scrap material suitable for the correct reaction temperatures. Low grade scrap materials are thus productively employed and given added value through the addition of absorbed non-ferrous metals. Ferrous metals may also be recovered if present in the shale or ore and are separated by skimming.

The process contemplates a treatment of oil shales alone, oil shales mixed with higher grade metal bearing ores, or metal bearing ores alone. Organic gases may be recovered by substituting a variety of carbonaceous materials in place of oil shale, including oil itself of any grade or condition, coal, gilsonite, or other carbon waste material, including wood and other vegetation. The quantity of valuable product recoverable from available raw materials may dictate the most feasible combination to be employed. The embodiments described above are therefore for purposes of example and are not intended to limit the scope of the invention.

I claim:

1. An apparatus for extracting organic products from mineral raw materials, comprising:
   an electric induction furnace of the type having a refractory crucible and capable of maintaining a charge of non-ferrous metal in a molten state with natural induction stirring thereof;
   an extraction chamber closing said induction furnace crucible against free entry of oxygen and providing a space above the crucible for receiving a batch of mineral raw material to be processed;
   a fractionating tower means for collecting organic vapors that, in use, may be generated from mineral raw material by the furnace;
   a connecting means for directing organic vapors from the extraction chamber to the fractionating tower means;
   skimming means for removing processed mineral raw material from the crucible charge and extraction chamber;
   intake means for delivering mineral raw material to the crucible;
   outlet means for receiving spent raw material from said skimming means and discharging the raw material from the extraction chamber; and
   means for substantially preventing oxygen entry during inlet and discharge of the raw material.

2. The apparatus of claim 1, wherein said electric induction furnace is of the coreless high frequency type, capable of maintaining an aluminum charge at temperatures in the range between 300° F. and 2000° F.

3. The apparatus of claim 1, wherein said extraction chamber comprises a hood covering said crucible and connected to said intake means and outlet means at locations defining openings for respectively receiving and discharging raw material.

4. The apparatus of claim 1, wherein said skimming means comprises a skimmer, means for raising and lowering the skimmer within the extraction chamber, and means for tilting the skimmer to discharge collected spent raw material into said outlet means.

5. The apparatus of claim 1, wherein said intake means comprises a hopper for receiving raw mineral material, a duct for feeding the raw material to the crucible, and means for controlling the flow of raw material through said duct.

6. The apparatus of claim 5, wherein said means for controlling the flow of raw material comprises a pair of spaced gates in said duct defining a first intergate volume therebetween.

7. The apparatus of claim 6, wherein said oxygen entry preventative means comprises means for delivering a non-oxygen gas into said first intergate volume.

8. The apparatus of claim 1, wherein said outlet means comprises a chute for receiving spent raw material and directing the raw material away from the crucible by gravity; and said oxygen entry preventative means comprises at least two spaced gates in said chute defining a second intergate volume therebetween.

9. The apparatus of claim 8, further comprising means for delivering a non-oxygen gas to said second intergate volume.

10. The method of recovering products selected from the group consisting of petroleum and non-ferrous metals from raw mineral materials, comprising:
    feeding a batch of raw mineral material in granular form to the surface of a molten non-ferrous metal charge in the refractory crucible of an electric induction furnace with an overlying substantially non-oxygen atmosphere;
    induction stirring the molten metal while in contact with the granular raw material to contact the molten metal with the surface of the raw material grains so that organic portions of the raw material are vaporized and non-ferrous metal portions are absorbed into the molten metal charge;
    skimming solid raw material residue from the surface of the metal charge and removing said residue from the crucible.

11. The process of claim 10, wherein said molten metal charge is contacted with the raw mineral material at a temperature in the range between 300° F. and 2000° F.

12. The process of claim 10, further comprising passing vaporized organic product directly through a fractionating tower without intermediate liquid storage.

13. The process of claim 10, wherein the raw material is a non-ferrous metal bearing ore, further comprising, prior to feeding the ore to the furnace, first pulverizing the ore, and then separating the heavy grains thereof by a gravity system.

14. The process of claim 10, wherein said feeding of raw material further comprises:
   receiving the raw material in a hopper;
   passing the raw material through a duct connecting the hopper to an oxygen excluding hood over the crucible;
   substantially removing oxygen gas from the raw material as it passes through said duct; and
   depositing the raw material from the end of the duct onto the surface of said metal charge in the crucible.

15. The process of claim 10, wherein said induction stirring is by a high frequency coreless type of induction furnace.

16. The process of claim 10, wherein said raw mineral material is selected from the group consisting of oil shale, coal, and gilsonite.

* * * * *